United States Patent [19]

Emerson et al.

[11] Patent Number: 5,434,866
[45] Date of Patent: Jul. 18, 1995

[54] DIGITAL COMMUNICATION SYSTEM WITH INTELLIGENT CHANNEL UNITS

[75] Inventors: Earl A. Emerson, Somerset, N.J.; Mahesh P. Desai, W. Easton, Pa.; Henry J. Gonzalez, Piscataway, N.J.; Kyung-Yeop Hong, Belle Mead, N.J.; Martin L. Swim, Morristown, N.J.

[73] Assignee: Integrated Network Corporation, Bridgewater, N.J.

[21] Appl. No.: 118,936

[22] Filed: Sep. 9, 1993

Related U.S. Application Data

[63] Continuation-in-part of Ser. No. 859,053, Mar. 27, 1992, Pat. No. 5,285,450.

[51] Int. Cl.$^6$ .......................... H04J 3/00; H04L 1/16
[52] U.S. Cl. ................. 370/99; 370/110.1; 371/33; 371/69.1
[58] Field of Search .................. 370/56, 58.1, 58.2, 370/58.3, 79, 82, 83, 97, 99, 110.1, 94.1, 94.2; 375/3, 3.1, 4, 7, 10; 340/825.06; 371/20.1, 20.2, 20.4, 24, 25.1, 27, 32, 33, 67.1, 69.1; 341/94; 178/70 R

[56] References Cited

U.S. PATENT DOCUMENTS

| | | | |
|---|---|---|---|
| 4,245,340 | 1/1981 | Landry | 370/111 |
| 4,534,025 | 8/1985 | Floyd | 370/94.1 |
| 4,636,584 | 1/1987 | Binkerd et al. | 379/240 |
| 4,849,972 | 7/1989 | Hackett et al. | 370/110.1 |
| 4,849,977 | 7/1989 | Baun, Jr. et al. | 371/49 |
| 4,939,725 | 7/1990 | Matsuda et al. | 370/99 |
| 5,020,132 | 5/1991 | Nazarenk et al. | 375/4 |
| 5,084,877 | 1/1992 | Netravali et al. | 371/32 |
| 5,128,930 | 7/1992 | Nazarenko et al. | 370/94.1 |
| 5,343,461 | 8/1994 | Barton et al. | 370/17 |

FOREIGN PATENT DOCUMENTS

3423217A1 1/1986 Germany.
60-242749 2/1985 Japan.

OTHER PUBLICATIONS

"Digital Data System Data Service Unit Interface Specification," Bell System Data Communications Technical Reference, Nov., 1981.
"Special Access Connections to the AT&T Communications Network for New Service Applications", AT&T Technical Reference, Oct. 1985.
Bell Communications Research, "Digital Channel Banks—Requirements for Dataport Channel Unit Functions," Technical Advisory, TA-TSY-000077, Issue 3 (Apr. 1986).
Zhou, Xiao You and Kamal, Ahmed E., "Automatic Repeat-Request Protocols and Their Queueing Analysis," *Computer Communications*, 13(5):298-311, (May, 1990).
Towsley, Don, "Error Detection and Retransmission Schemes in Computer Communication Networks," *Computer Communications Networks*, IEEE Catalog No. 78CH 1388-8C, pp. 12-17, (Sep. 1978).
Bruneel, Herwig and Moeneclaey, Marc, "On the Throughput Performance of Some Continuous ARQ Strategies with Repeated Transmissions," *IEEE Transactions on Communications*, vol. COM-34, No. 3, pp. 244-249, (Feb. 1986).
Nakamura, Makoto and Takada, Yasushi, "ARQ Scheme Reinforced with Past Acknowledgment Signals," *Electronics and Communications in Japan*, 72(22):93-100 (Sep. 1989).

*Primary Examiner*—Alpus Hsu
*Attorney, Agent, or Firm*—Hamilton, Brook, Smith & Reynolds

[57] ABSTRACT

In a time division multiplex digital communication system, access devices are capable of generating and detecting data sequences that are normally suppressed by end user equipment for establishing in-band communications between the access device and selected intelligent channel units (ICU's). In-band communication is initiated by transmitting a sequence comprising a plurality of first bytes for preventing inadvertent initiation of maintenance operations for digital devices in a particular time slot, followed by a plurality of second bytes in said time slot. In-band communications is established when the selected ICU receives a sequence comprising a plurality of said first bytes, a plurality of bytes which identify the select device and a plurality of said second bytes. Once established, in-band communications can then be used to accomplish automated provisioning, performance reporting, status reporting, alarm reporting as well as other important functions.

22 Claims, 4 Drawing Sheets

DIGITAL COMMUNICATION SYSTEM WITH INTELLIGENT CHANNEL UNITS

RELATED APPLICATIONS

This is a continuation-in-part of U.S. Patent application Ser. No. 07/859,053 filed Mar. 27, 1992 and incorporated herein by reference.

BACKGROUND OF THE INVENTION

The use of completely digitized communication systems such as the Integrated Service Digital Network (ISDN) is becoming more common. Such systems offer voice data image transmissions to the consumer. By replacing analog voice systems with digital capability, large amounts of information of high quality can be transmitted along copper wires which are used as digital channels.

To carry a digital signal on an analog line, a modem must be used to generate signals of different frequency to represent digital bits. By comparison, a completely digital system does not require a modem. Network interface devices are used to access the system. The standard data rate for an ISDN bearer channel system is 64 kilobits per second (Kbps). Terminal equipment such as a D4 bank or digital private exchange (PBX) can be used to interface a plurality of terminal equipment with a central exchange device. The D4 bank has 24 channel units and can service 24 remote subscribers, each having a transmit line and a receive line which can operate at up to 64 Kbps. The channel units are modular devices which, in general, convert incoming signals to local loop format, respond to test commands and interface to channel bank backplanes.

Digital communication systems supply large amounts of data, voice, and video information at a high signal to noise ratio with a minimum of distortion and efficient interface transfer capability. To assure that such a digital system operates at its optimum characteristic, each communication channel in the system must be fully operational and in the proper state. Conventionally, manual access to the individual channel units for each channel is required to perform functions, such as provisioning, performance reporting, status reporting, alarm reporting. These manual methods are typically awkward, limited in functionality, inefficient and labor intensive.

In a time division multiplexed (TDM) digital communication system, a digital terminal time multiplexes signals received from a plurality of lines into communication channels (or time slots) so that they may be transmitted over a single communications line. At the remote end of the line, the signals are converted in a like digital terminal and distributed on a plurality of channels (or time slots) to remote end users. End users employ Customer Premises Equipment (CPEs) which are coupled to a digital terminal via the aforesaid digital channel units (CUs) to access the system and communicate with the other end users.

SUMMARY OF THE INVENTION

An "Intelligent Channel Unit" (ICU) is provided for a digital communication system which includes data processing circuitry to enable channel units to be remotely reconfigured over an in-band channel to perform various functions, thereby avoiding the necessity of manually replacing channel units in the field.

The digital communication system comprises CPEs with a 64 Kbps data rate capability coupled to a digital terminal via intelligent digital channel units (ICUs). A 64 Kbps CPE employs data formatting circuitry to transmit data sequences over the system to other CPEs. The data formatting circuitry formats the data into a series of 8-bit bytes referred to as a transmit sequence. Each byte in the transmit sequence has data in all 8-bits, therefore only a limited set of data sequences are available for initiating in-band maintenance operations to an ICU in the system.

"In-band" communication refers to the use of existing communications lines and time slots to communicate to or from selected ICUs without affecting other existing units or non-intelligent channel units, in the system and without requiring additional time slots or dedicated communication lines.

Access devices establish in-band communications in associated time slots by using a communication protocol comprised of three phases: Phase I comprises establishing an in-band communication mode between the access device and the selected ICU; Phase II comprises exchanging Command or Data information between the access device and the ICU and Phase III comprises terminating the in-band communication mode. Protocols for establishing each phase are provided in accordance with the invention.

To maintain a reserved set of data sequences for in-band communication, a suppression circuit is employed for suppressing transmission of specific customer data sequences. The suppression circuit prevents the CPEs from introducing a maintenance or other sequence into the system and inadvertently activating maintenance or other operations in the system. In this way, only the access device can introduce a maintenance sequence into an existing system for initiating maintenance operations.

In accordance with the present invention these suppressed sequences are used by an access device to establish "in-band" communication with ICUs, not only for maintenance provisioning but for a variety of purposes such as performance reporting, alarm reporting and status information.

The above and other features of the invention including various novel details of construction in combination of parts may now be particularly described with reference to the accompanying drawings and pointed out in the claims. It will be understood that the particular device embodying the invention is shown by way of illustration only and not as a limitation of the invention. The principles and features of this invention will be employed in varied and numerous embodiments without departing from the scope of the invention.

DETAILED DESCRIPTION OF THE INVENTION

General Description of the Communication System

Figure 1:
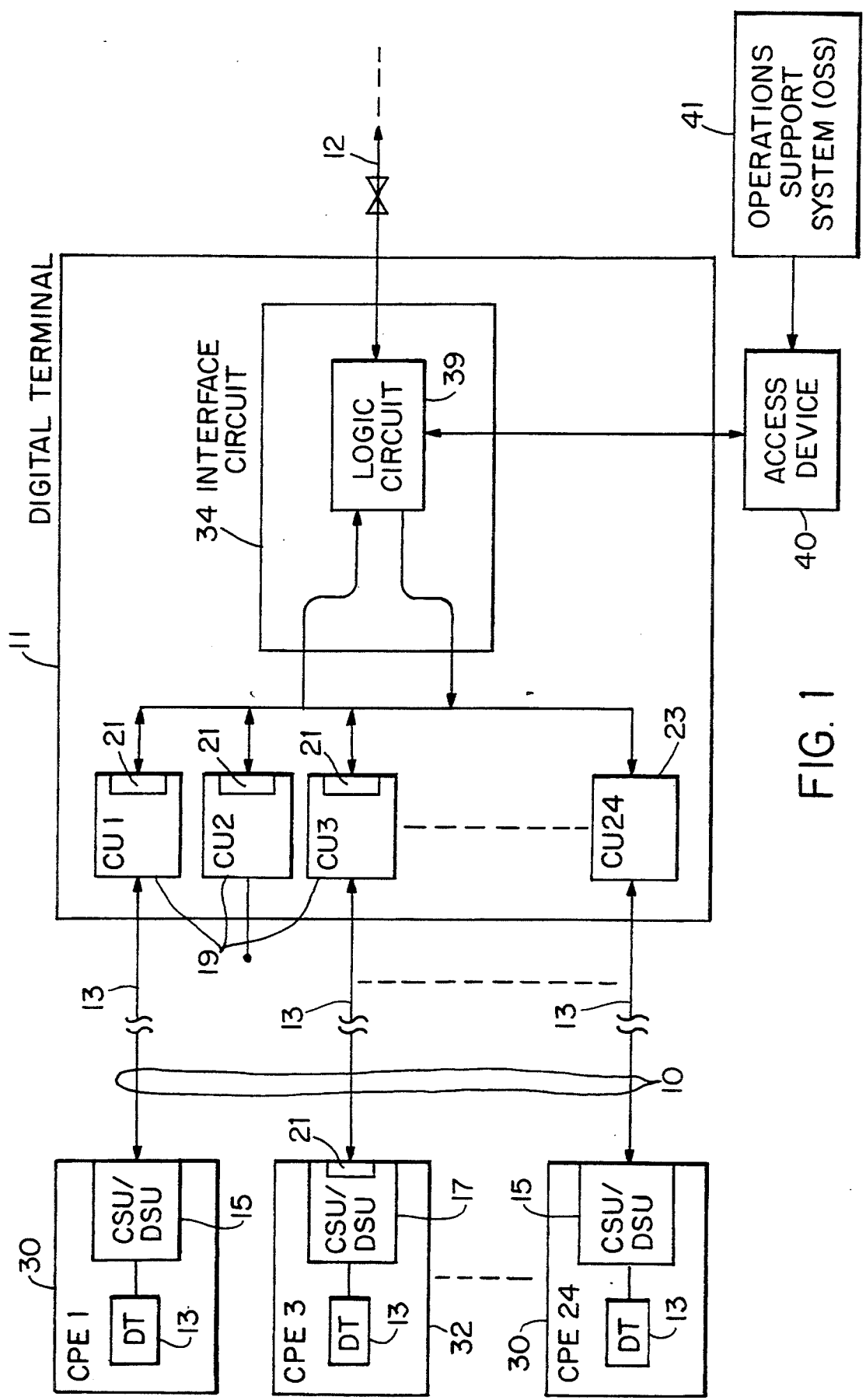
FIG. 1 is a block diagram of a time multiplexed communication system employing the present invention.

A digital communication system embodying the present invention is shown in FIG. 1. A Digital Terminal 11 multiplexes signals received from multiple lines 10 forming communication channels so that the multiplexed signal may be transmitted upstream over the network on a single communications line 12. At the remote end of the line 12 (not shown), the signals are converted (demultiplexed) in a like manner and distributed onto multiple lines to remote end users. Conversely, signals from a remote end user are received by digital terminal 11 and demultiplexed and distributed to end user CPEs 30 and 32. End users employ Customer Premises Equipment (CPEs 1, 3-24) 30 or 32 to access the system and communicate with other end users. A first type of CPE 30 is known in the art, such as the CPE described in U.S. Pat. No. 4,849,972 to Hackett, et al. incorporated herein by reference. A second type of CPE 32 employs a Customer Service Unit/Data Service Unit (CSU/DSU) 17 embodying the intelligent processor circuit 21 of the present invention as described below. Both types of CPE 30, 32 comprise a Data Terminal (DT) 13 and a Customer Service Unit/Data Service Unit (CSU/DSU) 15, 17. Each DT 13 employs a computer which generates a serial data stream for transmission over the data communication system to a remote DT (not shown). The CSU/DSU receives the serial stream from the DT and transforms it into a system compatible format for transmission over the system to the remote DT.

The Digital Terminal 11 also comprises digital Channel Units (CUs) 19 and 23, each of which is associated with one of the digital signal lines 10. A first type of CU 23 is known in the art, while a second type of CU 19 is an ICU of the invention which also employs a circuit 21 of the present invention. The output of the digital CUs are converted from parallel-to-serial bit streams and are coupled to an interface circuit 34, which is, in turn, connected to the digital communications line 12. The interface circuit 34 includes logic circuit 39 of the present invention, which is controlled by a remote access device 40, such as a controller. An Operations Support System (OSS) 41 communicates with the access device 40 to retrieve performance monitoring data, perform testing and to initiate remote processing.

Typically, maintenance operations are initiated when two CPEs (end users) are unable to communicate with each other. The maintenance tests are individually performed on each CU and CPE associated with a particular channel. Next, maintenance operations are performed on each remote CU and CPE associated with the same channel (not shown), but located on the upstream or right-hand side of FIG. 1 and coupled to the Digital Terminal 11 via the digital line 12.

The present invention comprises in-band circuitry 21 that takes advantage of certain suppressed codes by generating data sequences for establishing in-band communications between a select device 19 and an access device 40. Once established, the in-band communications link is utilized for a number of operations such as provisioning, performance reporting or diagnostics. An "access device" includes any device capable of performing a control function, a provisioning function, a diagnostics function or a reporting function.

Select devices employing intelligent circuitry 21 of the present invention are compatible with existing communication systems. As such, an entire system need not be replaced to incorporate an access device, for in-band communication capability. Further, CUs and CPEs employing intelligent circuitry 21 may be coupled into the system in a variety of combinations.

On one channel, a channel unit 19 (CU1) having intelligent circuitry 21 is coupled to an existing CPE 30 (CPE1). In this configuration, only CU1 can participate in in-band communications with the controller 40 or another ICU. A second channel comprises CPE3 having intelligent circuitry 21 coupled to CU3 which also has intelligent circuitry 21. Both CPE3 and CU3 are capable of participation in in-band communications with the controller or another ICU. The use of ICU's is preferred, however existing CU devices can operate in the system without employing such intelligent circuitry although these existing devices are not able to participate in in-band communications. For example, both CPE 24 and CU24 operate normally in the system despite not having intelligent circuitry 21.

Figure 2:
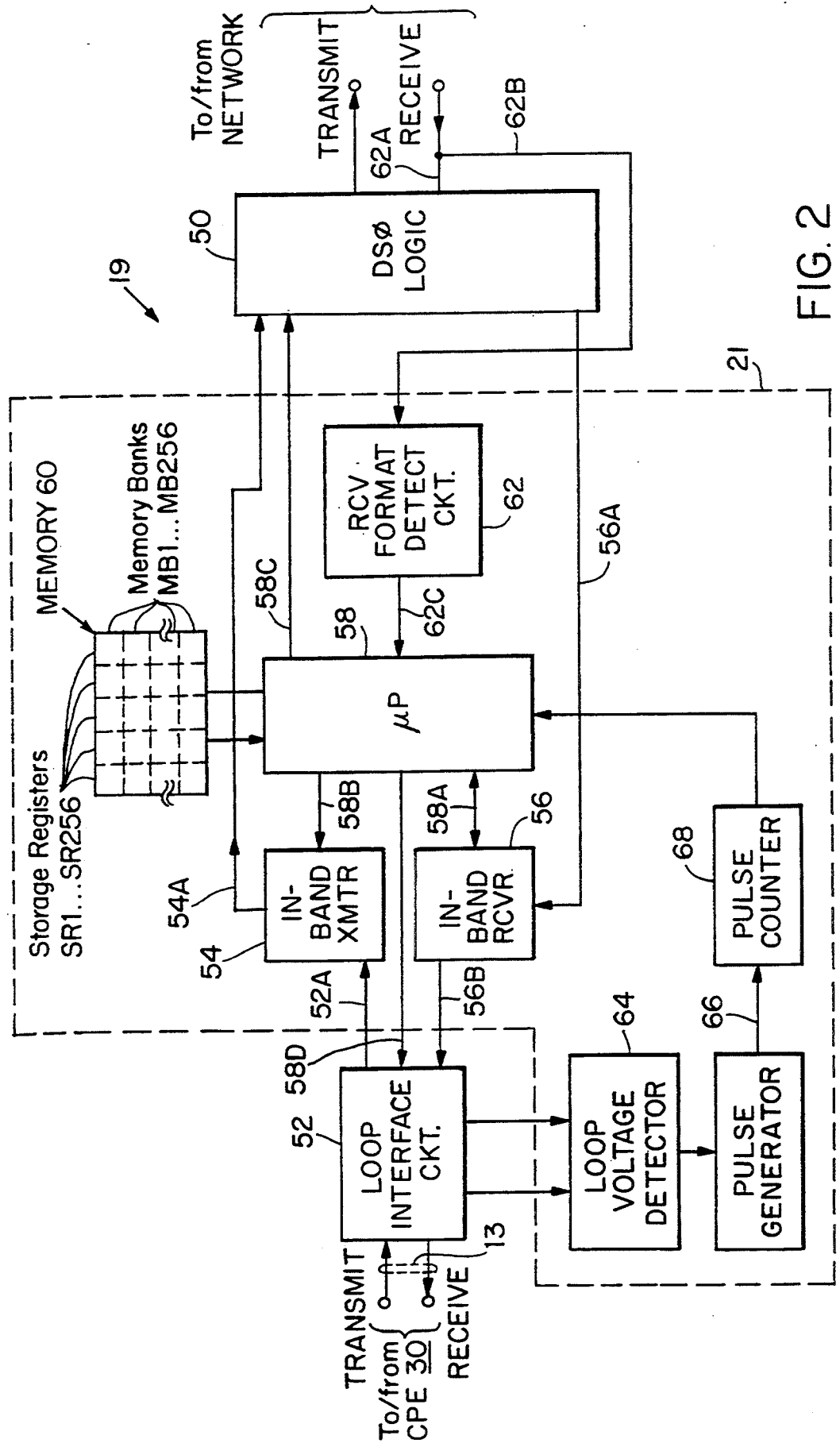
FIG. 2 is a block diagram of a typical intelligent channel unit in accordance with the invention.

Referring now to FIG. 2, the details of an intelligent channel unit 19 will be explained in simplified form. An intelligent channel unit is comprised of intelligent circuitry 21, a loop interface circuit 52 and DSO logic circuit 50. The loop interface circuit is a standard circuit used in channel units to connect a respective channel unit over local pairs 13 to and from CPEs 30. It performs one or more of the following functions: equalization, generating sealing current, generating signals of correct amplitude and bit rate, and isolation of extraneous signals, i.e., lightening.

The output of circuit 52 on line 52A is a serial bit stream in a network compatible format, such as 19.2 kbps with proper framing bits, etc. This output is coupled to in-band transmitter 54 of intelligent circuitry 21 (shown in dotted lines).

Where in-band communication has not been established in accordance with the invention, the signal on line 52A is directly passed out of transmitter 54 on line 54A to DSO logic 50. DSO logic 50 is a standard logic circuit that interfaces to the network. Logic 50 performs one or more of the following functions, inter alia, inserts and removes error correction formats, and reads and writes from multiplexed bit streams. Thus, the loop interface circuit 52 and the DSO logic 50 perform the functions of a standard channel unit and the circuit 21 is added to form an ICU 19.

In in-band communication, the transmitter 54, as controlled by microprocessor 58, transmits the in-band communication messages from the microprocessor toward the network over the same path previously described. Microprocessor 58 recognizes the requirement for in-band communication by a protocol to be described below.

In the other direction, the received bit stream from the network is coupled to DSO logic 50 and to receiver format detector circuit 62 over lines 62A and 62B, respectively. Under non-in-band communication conditions, as indicated by microprocessor 58 to in-band receiver 56 over line 58A, the bit stream on line 62A, after being error corrected, etc. in DSO logic 50, is coupled on line 56A to in-band receiver 56 where it is directly coupled out to interface circuit 52 on line 56B.

During in-band communication, the bit stream on line 62A, after being processed in DSO logic 50, is coupled to in-band receiver 56, where it is read by microprocessor 58 via line 58A. The microprocessor recognizes the presence of an in-band communication via the protocol to be described in detail later. Upon recognition, the microprocessor via line 58B commands the in-band transmitter to send appropriate responses back to the access device 40 (FIG. 1). On line 58D, extending between microprocessor 58 and loop interface circuit 52, the microprocessor 58 controls the configuration of the loop interface circuit. Via line 58D, the microprocessor can modify the intelligent channel unit loop interface configuration based on in-band provisioning requirements communicated to the circuit 21.

An additional feature of the circuit 21 provides an automatic adjustment of the expected channel unit format by coupling the reserved bit stream on line 62B to a RCV format detect circuit 62. Circuit 62 detects the receive format in terms of bit rate and error correction capabilities and provides that information to the microprocessor 58 via line 62A. The microprocessor 58, upon receipt of the format information, reconfigures the DSO logic 50 consistent with the detected format via line 58C.

A memory device 60 contains a plurality of memory banks, preferably 256 (MB1...MB256) (which may or may not be a part of microprocessor 58). Each memory bank contains information in storage registers for processing performance inventory and alarm and event status, among other things. Preferably, each memory bank contains 256 storage registers SR1...SR256. Information is read into, or written out of, the device 60 by microprocessor 58, as will also be described later.

Circuit 19 also monitors far end performance of the local loop, as described in co-pending U.S. application Ser. No. 08/028,876 filed Mar. 11, 1993 (incorporated herein in its entirety by reference) and therefore need not be described in detail here. Briefly, circuit 64 measures the absence of current flow on the local loop to produce voltage. If no voltage is present, the pulse generator produces a pulse which is accumulated. Each pulse produced is counted by counter 68 and fed to microprocessor 58 as a measure of far end loop "errored seconds".

Wake-up Sequence

Referring back to FIG. 1, in-band communication is initiated by transmission of a wake-up sequence to or from the access device 40 and to or from an ICU 19. Unless otherwise indicated, for this description, it is assumed that the communication is initiated by the access device. The wake-up sequence consists of the following codes:

| Code No. | Bit Pattern | Code Name | Minimum No.* |
|---|---|---|---|
| Code 1 | S0111010 | TIP code | 40 |
| Code 2 | S1101100 | IDS code | 40 |
| Code 3 | S1010110 | LBE code | 120 |
| Code 4 | S1111111 | All 1s code | 40 |
| Code 5 | S1010110 | LBE code | 120 |
| Code 6 | S1011010 | FEV code | 40 |

*The minimum number is a preferred or optimally efficient value and may, in some cases, comprise less than the stated value. In particular, the number of TIP or FEV codes may be as low as 30 without substantially compromising performance.

All the above codes are preferably transmitted contiguously. Codes 4 and 5 are transmitted only if there are multiple intelligent channel units in tandem and are repeated N number of times; where N is the number of intermediate units between the access device and the intelligent channel unit being accessed. For different types of intelligent channel units in tandem, Codes 4 and 5 described in the above wake-up sequence are not used. All of these codes are described in Bell Core "Digital Channel Banks—Requirements for Data Point Channel Unit Functions", Issue Apr. 3, 1986 TA-7SY.000077.

Figure 3:
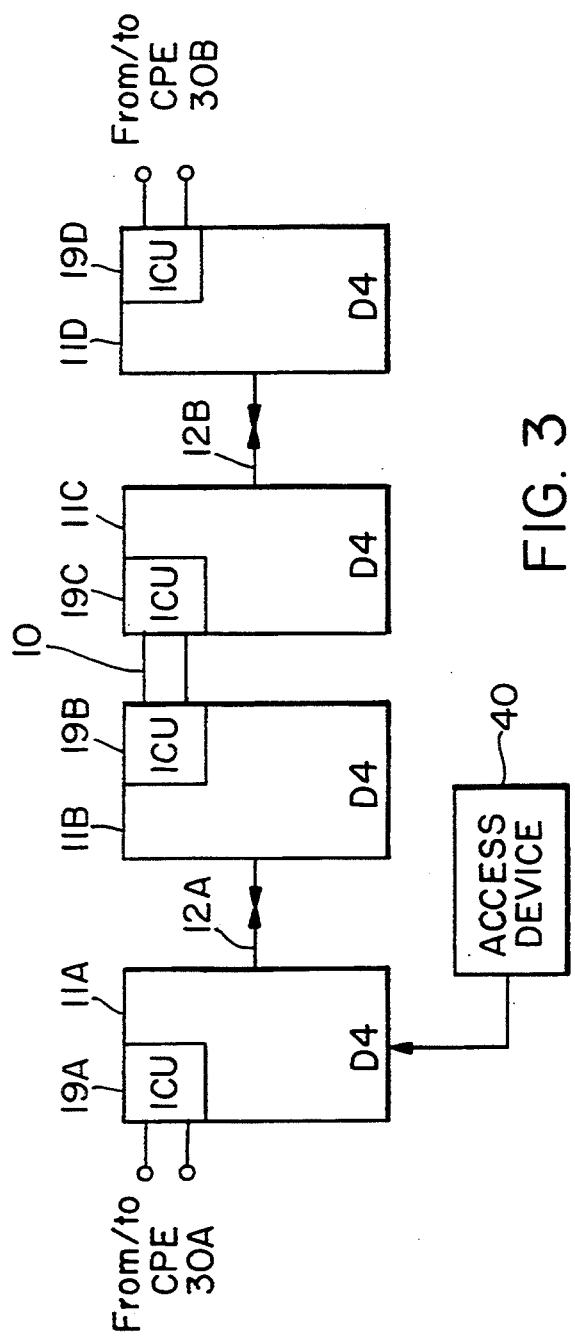
FIG. 3 is a diagram of a tandem arrangement of intelligent channel units.
Figure 4:
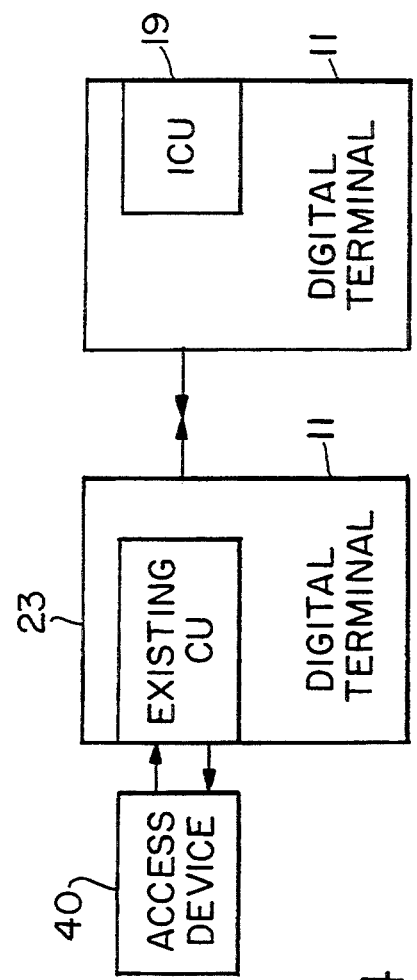
FIG. 4 is a diagram illustrating point-to-point tandem connection of existing customer units with intelligent channel units.

First, after the minimum number of TIP (Transition in Progress) codes are recognized by the microprocessor 58 in the ICUs 21, any intermediate states in the intelligent channel unit are cleared away. The receipt of the TIP codes reset several state machines that exist in the intelligent channel unit 19. These state machines (not shown) include a latching loopback state machine and an in-band communication activities detection state machine. Reset of a state machine causes it to begin code detection at the top of the state machine (i.e., require receipt of all codes necessary to traverse the entire state machine. Next, the IDS (In-band Device Select) codes are recognized by the microprocessor in intelligent channel unit. The IDS codes are sometimes referred to as Function Codes (FC) or Loop Back Select (LSC) codes. After receiving more than 30 IDS codes correctly, further recognition of the wake-up sequence is enabled by the microprocessor at the intelligent channel unit. Next, when the LBE (Loop Back Enable) codes have been received at a channel unit that had previously recognized IDS codes, they are processed in two steps. First, after 30 or more LBE codes have been received at an intelligent channel unit, that intelligent channel unit must map, or convert, the remaining LBE codes into appropriate different codes depending upon the type of the intelligent channel unit involved. These map codes prevent inadvertent activation of the in-band communication mode in downstream units. Second, the intelligent channel unit recognizes the remaining LBE codes and if properly recognized, the intelligent channel unit is enabled for recognition of the FEV (Far End Voice) codes. When the FEV codes are detected, the intelligent channel unit is programmed into the in-band communication mode.

Where identical intelligent channel units are connected in tandem as shown in FIG. 3, Codes 4 and 5 of the wake-up sequence are used to select the desired access location by repeating Codes 4 and 5 N times where N is the number of identical intelligent channel units that lie between the access device and the intelligent channel unit to be accessed. For purposes of this description assume that N=1 and that the second intelligent channel unit 19C from the access device is being accessed.

In FIG. 3 access device 40 is coupled to a D4 digital terminal 11A which converts incoming voice or data communication from 24 CPE units to an appropriate format and multiplexes the formatted signals into TDM signals using 24 channel units, at least one of which is an ICU 19A. The multiplexed signals are transmitted over carrier lines 12A to a second digital terminal 11B having a second ICU 19B operating in the same time slot as ICU 19A. The ICU 19B is directly coupled by lines 10 to a terminal ICU 19C in digital terminal 11C. The ICU 19C signals are coupled over carrier line 12B to D4 terminal 11D, demultiplexed and reformatted in ICU 19D for coupling over wires 10C to CPE 30B.

When the access device transmits the TIP codes and the IDS codes, both intelligent channel units ICU 19B and 19C receive both codes. When the access device transmits the LBE codes both intelligent channel units receive the first 30 LBE codes. After reception of the first 30 LBE codes, both intelligent channel units start mapping the LBE codes into appropriate map codes and continue to try to recognize the remaining sequence of LBE codes. This can only be accomplished by the first intelligent channel unit since the second intelligent channel unit is now receiving map codes. The second intelligent channel unit returns to the same state it was in when it recognized the IDS codes, if, after it receives the initial 30 LBE codes, it does not detect LBE codes for 0.375 to 0.625 milliseconds and it remains in this state until it receives either TIP codes or LBE codes. Because the access device is accessing the second intelligent channel unit, after transmitting Code 3, the access device transmits Codes 4 and 5 once. The first intelligent channel unit, when it detects more than 30 all One's codes stops mapping the LBE codes into map codes. The LBE codes sent next by the access device will be received at both the first and the second intelligent channel unit locations. The first intelligent channel unit is now in the transparent state in which it ignores all codes except TIP codes, which would return it to a normal transmission state. At the second intelligent channel unit, the LBE codes are mapped into map codes (after receiving more than 30 LBE codes) and the second intelligent channel unit is enabled for reception of the FEV codes. When the second intelligent channel unit receives the FEV codes, it goes into the in-band communications mode.

In order to prevent accidental activation of the wake-up sequence over a long period of time, the intelligent channel unit starts a 10-second timer when the IDS codes have been successfully received. The timer is automatically turned off when the FEV bytes have been successfully received and the intelligent channel unit goes into the in-band communication mode.

Verification of Establishment of the In-band Communication Mode

The access device verifies that the intelligent channel unit is in the in-band communication mode by performing one of the following two steps:
a) Transmitting code 6 FEV bytes and ensuring that FEV bytes are received from the intelligent channel unit. An exception to this occurs with an OCU without secondary channel capability, i.e., an additional lower speed channel. The OCU without secondary channel capability maps confirmation bytes (S1111010) back to the access device instead of the FEV codes.
b) Transmitting 30 or more LBE codes and receiving the appropriate map code from the intelligent channel unit after the first 30 LBE bytes are transmitted.

Intelligent Channel Unit Behavior in the In-band Communication Mode

After the intelligent channel unit goes into the in-band communication mode, it transmits Mux Out Of Sync (MOS) codes consisting of S0011010 in the downstream direction and all One's bytes towards the access device. The intelligent channel unit stops transmitting the all ones bytes towards the access device when it responds to a command received from the access device.

Time-out

If the intelligent channel unit does not receive a valid command from the access device within 10 minutes after it goes into the in-band communication mode it comes out of the in-band communication mode and goes back to normal transmission.

If the access device does not receive a valid response from the intelligent channel unit in response to command/data transmitted by the access device for a duration of more than 10 seconds, it transmits TIP codes to the intelligent channel unit to terminate the in-band communication mode.

If the 10 second timer expires before the intelligent channel unit receives the appropriate number of LBE and FEV codes back from the access device, the intelligent channel unit ignores the reception of the TIP and IDS codes and goes back to normal condition.

Command/Data Byte Exchange

After the access device receives the in-band command mode acknowledgement from the intelligent channel unit, the access device sends the appropriate command for the desired function. The access device and the intelligent channel unit can transmit/receive as many command/data bytes as required to accomplish a specific task or tasks.

For error immunity purposes, the access device continuously transmits command/data bytes in a multiple of three until it receives a valid response from the intelligent channel unit. A valid response from the intelligent channel unit is defined as three consecutive identical appropriate response bytes. The intelligent channel unit transmits a valid response on reception of valid command or data from the access device. Valid command or data from the access device is defined as three consecutive identical command or data bytes.

When the access device receives a valid response from the intelligent channel unit, it transmits the next command/data bytes as appropriate.

Termination of the In-band Communication Mode

After the command/data byte transmission/reception between the access device and the intelligent channel unit, the access device terminates the in-band communication mode by transmitting TIP codes for a minimum duration of 2 seconds. After the intelligent channel unit detects 30 or more TIP codes it resumes normal operation.

Registers in the Intelligent Channel Unit

As previously described in connection with FIG. 2, the intelligent channel unit has a memory device consisting of at least 256 memory banks (MB2...MB256), each having at least 256 storage registers (SR1...SR256) that can be accessed by the access device via in-band communication with the microprocessor 58 in the ICU 19. The register contents depend on the type of intelligent channel unit used. Most of the registers can be read from as well as written to. Typical register types and locations for intelligent channel units are shown in Chart 1 below:

| Register # | Register Name | # of bits | R/W | MS/G |
|---|---|---|---|---|
| | CHART 1 | | | |
| 0-1 | Intelligent channel unit ID | 8 | R | MS |
| 2-3 | Intelligent channel unit hardware ID code | 8 | R | MS |
| 4-5 | Intelligent channel unit device type | 8 | R | MS |
| 6-27 | Intelligent channel unit CLEI | 88 | R | G |

CHART 1 -continued

| Register # | Register Name | # of bits | R/W | MS/G |
|---|---|---|---|---|
| | code | | | |
| 28–55 | Intelligent channel unit part number | 112 | R | MS |
| 56–83 | Intelligent channel unit serial number | 112 | R | MS |
| 84–111 | Intelligent channel unit firmware number | 112 | R | MS |
| 112–113 | Intelligent channel unit template revision | 8 | R | MS |
| 114–121 | Intelligent channel unit status registers | 32 | R | MS |
| 122–123 | Intelligent channel unit control register | 8 | R/W | MS |
| 124–155 | Provisioning registers | 256 | R/W | MS |
| 156– | Performance Monitoring registers | | R/W | MS |

Notes:
1) R/W denotes Read/Write and R denotes Read only registers.
2) MS denotes Manufacturer Specific definitions and G denotes generic definitions.
3) All the registers numbered from 0 through 123 are independent of the type of intelligent channel unit being accessed. The interpretation of the information in registers 124 through 65536 depends on the type of the intelligent channel unit.
4) The device type register will be used to uniquely identify the type of the intelligent channel unit based on its functionality.

The access device may read or write a register in the intelligent channel unit or the intelligent channel unit may send a request to the access device to have the access device read one or more of its registers. All of this is accomplished, as previously described in connection with FIG. 2, once the in-band communication channel is established.

All the registers are 4-bit registers and there are up to 65536 registers available per intelligent channel unit depending on the type of the intelligent channel unit. The information is stored in one or more 4-bit registers. This means that if a register is 16-bits in size then 4 accesses to 4-bit registers is required to access all the 16-bits. The registers are grouped into memory banks of 256 registers. There may be up to 256 memory banks with 256 4-bit registers in each bank.

Command/Data/Response Byte Structure

This section provides information regarding the byte structure used by the microprocessor 58 for the transmission and reception of in-band communication command/data/response bytes.

All the bytes transmitted by the access device towards the intelligent channel unit are defined as command/data bytes and all the bytes transmitted by the intelligent channel unit towards the access device are defined as response bytes.

The access device is capable of generating a command byte or a data byte.

A command byte is defined as a byte that uniquely specifies a command to be sent to the intelligent channel unit.

A data byte is a byte that contains a data nibble (4-bits) to be sent to the intelligent channel unit.

The data byte would normally follow a command byte.

The intelligent channel unit transmits a response byte from in-band transmitter 54 in response to most of the command/data bytes transmitted from the access device via line 62A towards the intelligent channel unit. The response byte transmitted by the intelligent channel unit towards the access device must meet specific guidelines to ensure an error free transmission/reception in both the directions.

Command/Data Byte Structure

This section defines the command/data byte structure for transmission from the access device 40 to the intelligent channel unit 19.

The format of a command or a data byte generated by the access device is as follows:

| 1 | 2 | 3 | 4 | 5 | 6 | 7 | 8 |
|---|---|---|---|---|---|---|---|
| S | C/D | C/D | O/A | M/T | M/A | M | 1 |

Bit 1 is transmitted first and bit 8 is transmitted last.

Bit 1 is the Subrate framing (S) bit. The access device uses this bit for subrate framing to transmit command and data bytes to the selected intelligent channel in a subrate multiplexer network. In non-subrate multiplexer applications, the S bit may take on values of 0 or 1.

Bit 2 is the Command/Data identifier (C/D) bit. The access device uses this bit to identify whether it is transmitting a command or a data nibble in bits 3–6 of the byte. A "nibble", as previously mentioned, is a group of four bits. The access device sets the C/D bit to a 1 for command nibble transmission and a 0 for data nibble transmission.

Bits 3, 4, 5 and 6 are the command or the data nibble bits. Note that less than four bits can be used for command or data transmission without significantly departing from the scope of the invention described.

Each command is identified by a unique combination of one or more command nibble(s). These bits have binary encoded command information in the range 0–C hexadecimal. This provides up to thirteen unique command types in the single nibble command mode. If the number of commands supported exceed thirteen, then bit 7 in the command byte is used to concatenate 2 nibbles to provide up to 169 unique command types. There is no restriction on the number of nibbles that can be concatenated for increasing the number of command types supported.

The encoded value E hexadecimal is reserved for use from the intelligent channel unit to the access device to indicate reception of an invalid command.

The encoded value F hexadecimal is not used because once the intelligent channel unit goes into the in-band communication mode, it sends an all One's byte towards the access device.

If the access device is transmitting a data byte to the intelligent channel unit, bits 3 through 6 have the 4-bit data.

Bit 7 is the More (M) bit. The access device sets this bit to a 1 to indicate that an additional nibble should be read by the intelligent channel unit to obtain all the bits of a command transmitted by the access device to the intelligent channel unit. This bit is set by the access device as many times as required to provide a uniquely defined command type.

Bit 8 is the Network Control bit. In order to minimize potential interference with other network equipment, this bit is always set to a 1.

Response Byte Structure

This section describes the response byte structure transmitted from the intelligent channel unit to the access device.

The format of a response byte generated by the intelligent channel unit is as follows:

| 1 | 2 | 3 | 4 | 5 | 6 | 7 | 8 |
|---|---|---|---|---|---|---|---|
| S | R | C/D | O/A | M/T | M/A | M | 1 |

Bit 1 is transmitted first and bit 8 is transmitted last.

Bit 1 is the Subrate framing (S) bit. The intelligent channel unit transmits the bit at the same logic level (0 or 1) as received in the previous command or data byte from the access device.

Bit 2 is the Response (R) bit. The intelligent channel unit reverses the logic level of bit 2 from the last command/data byte received from the access device and transmits it as part of the response byte transmitted to the access device.

Bits 3, 4, 5 and 6 are the response nibble bits. Note that less than four bits can be used for command or data transmission without significantly departing from the scope of the invention described.

If the intelligent channel unit receives a valid command or data byte, it encodes bits 3 through 6 exactly the same as the received bits 3 through 6 with the following exceptions:

a) If the command is a read selected register command, bits 3 through 6 have the actual 4-bit data read from the selected register.

b) If the command is a reset provisioning parameters command or a reset all command, no acknowledgement is expected by the access device.

On reception of a read selected register or write selected register command issued for reading or writing the contents of an undefined register, the intelligent channel unit encodes a D hexadecimal in bits 3–6 and transmits the response byte to the access device with the R bit set appropriately. On reception of a write selected register command, issued for writing into a read only register, the intelligent channel unit encodes a D hexadecimal in bits 3–6 and transmits the response byte to the access device with the R bit set appropriately.

On reception of an invalid command type (encoded in bits 3–6), the intelligent channel unit encodes a E hexadecimal i.e., 1110 in bits 3–6 and transmits the response byte to the access device with the R bit set approximately i.e., toggled from the byte received.

Bit 7 is the More (M) bit. The intelligent channel unit uses this bit to identify register boundaries. This bit is used by the intelligent channel unit to indicate to the access device that an additional nibble should be read from or written to by the access device to get to all the bits in a single register of size greater than 4-bits. This bit is set by the intelligent channel unit as many times as is required to ensure meaningful reading from or writing to registers of varying bit sizes.

Bit 8 is the Network Control bit. In order to minimize potential interference with other network equipment, this bit is always set to a 1.

Information Exchange Protocol

This section describes the in-band communication commands, in-band communication initiation methods and task execution.

Commands

The access device supports 9 different commands for performing various activities. Depending on the needs arising from various types of intelligent channel units more commands may be supported as necessary. These commands are classified into three categories as follows:

1) Address selection
2) Read/Write
3) Supervisory control

Address Selection Commands

The address selection commands are used to specify a particular register address in memory 60. Before any read/write activity is performed on a register it has to be selected by a combination of the address selection commands.

For selecting one out of 256 memory banks (memory bank 0 through memory bank 255) an 8-bit memory bank select command byte register is defined. For selecting one out of 256 registers (register 0 through register 255) in a particular intelligent channel unit, an 8-bit register select register command byte is defined. The memory bank select register or the register select register is selected by identifying the high and the low nibble addresses. The following four commands are used to select a particular register for a read/write operation:

a) Memory bank high nibble register address select
b) Memory bank low nibble register address select
c) Register high nibble register address select
d) Register low nibble register address select The command byte format for these commands are listed in Chart 2 below:

CHART 2
Commands

| Command Type | Command | Bits (3–6) |
|---|---|---|
| Address Selection | Memory bank high nibble register address select | 0000 |
| | Memory bank low nibble register address select | 0001 |
| | Register high nibble register address select | 0010 |
| | Register low nibble register address select | 0011 |
| Read/Write | Read selected register | 0100 |
| | Write selected register | 0101 |
| Supervisory Control | Reset performance monitoring registers | 0110 |
| | Reset provisioning parameters | 0111 |
| | Reset all | 1000 |

The intelligent channel unit defaults to memory bank 0 any time it goes into the in-band communication mode.

The registers in the intelligent channel unit are defined such that all the registers with similar type of information are located in sequential addresses. Also, after each and every read/write command, the intelligent channel unit points to the register in the next sequential location. So, once the first register in a group of registers that need to be read from or written to is accessed, subsequent read/write commands can be used without selecting the next register.

Read/Write Commands

The read/write commands are used by the microprocessor 58 to read from or write to a selected register. The following commands are used to read/write from/to a selected register:
 a) Read selected register
 b) Write selected register The response from the intelligent channel unit to the access device for a read selected register command is the 4-bits read from the selected register. The read selected register command can be issued without selecting the register address for consecutive read operations from sequentially numbered registers. Two consecutive read selected register command responses generated by the intelligent channel unit could be exactly the same byte. In order to ensure unambiguous read operations, any two consecutive read operations will have an all ones sequence between the read operations. So, after the access device receives a valid response from the intelligent channel unit in response to the first read selected register command, the access device transmits an all ones byte until it receives an all ones byte from the intelligent channel unit. After successful reception of the all ones byte, the access device transmits the second read selected register command.

The response from the intelligent channel unit to the access device for a write selected register command follows the guidelines outlined in the section on Response Byte Structure above. After the write selected register command response is received by the access device, the access device transmits the actual 4-bits to be written into the selected register in the next data byte. The write selected register command can be issued without selecting the register address for consecutive write operations into sequentially numbered registers. Two consecutive data nibbles to be written could be exactly the same. In order to ensure unambiguous write operations, any two consecutive write operations will have an all ones sequence between data bytes. So, after the access device receives a valid response from the intelligent channel unit in response to the first data byte to be written, the access device transmits an all ones byte until it receives an all ones byte from the intelligent channel unit. After successful reception of the all ones byte, the access device transmits the second data nibble to be written.

Supervisory Control Commands

The supervisory control commands are used to perform supervisory functions on the intelligent channel unit. This category of commands can be used to reset performance monitoring registers in the memory 60 of the intelligent channel unit 19, to reset all the provisioning parameters in the memory 60 of the intelligent channel unit 19 or to perform a power-up type reset function along with the resetting of all the performance monitoring registers as well as the provisioning parameters. The following commands are defined in this category:
 a) Reset Performance Monitoring registers
 b) Reset Provisioning parameters
 c) Reset all The response from the intelligent channel unit towards the access device to the reset performance monitoring registers command follows the guidelines outlined in the Response Byte Structure above.

The access device does not expect any immediate response to the reset provisioning parameters command. The intelligent channel unit will continue transmitting service request sequences towards the access device until it is provisioned.

The access device does not expect any specific response to the reset all command. After the intelligent channel unit is reset using the reset all command the intelligent channel unit will continue transmitting the service request sequences (as defined later) until it is provisioned.

Communication Initiation

There are two methods of initiation of communication between an access device and the intelligent channel unit. They are as follows:
 1) Communication Initiated by the access device
 2) Communication Initiated by the intelligent channel unit.

Communication Initiated by the Access Device

The access device initiates communication with the intelligent channel unit to perform one or more of the following tasks:
 1) Provision the intelligent channel unit
 2) Read the performance monitoring registers in the intelligent channel unit
 3) Read the CLEI code of the intelligent channel unit
 4) Read the part number of the intelligent channel unit
 5) Read the serial number of the intelligent channel unit
 6) Read the revision number of the intelligent channel unit
 7) Read the device type of the intelligent channel unit
 8) Read the intelligent channel unit ID code
 9) Read the provisioning registers in the intelligent channel unit
 10) Read the status registers in the intelligent channel unit
 11) Reset the performance monitoring registers in the intelligent channel unit
 12) Reset the provisioning parameters in the intelligent channel unit
 13) Reset the intelligent channel unit entirely
 14) Set threshold register values in the intelligent channel unit.

Communication Initiated by the Intelligent Channel Unit

The intelligent channel unit initiates the communication with the access device to perform one or more of the following tasks:
 a) Inform the access device that the unit is just powered up and needs to be provisioned
 b) Inform the access device of some fault detected in the channel unit
 c) Inform the access device of high occurrences of some monitored events.

For communication initiated from the intelligent channel unit to the access device, the intelligent channel unit transmits a service request sequence to the access device.

The service request sequence consists of the following codes:

| Code No. | Bit Pattern | Code Name | Minimum No.* |
|---|---|---|---|
| Code 1 | 10111010 | TIP code | 40 |
| Code 2 | 10011100 | Service request code | 40 |
| Code 3 | 11010110 | LBE code | 120 |
| Code 4 | 11011010 | FEV code | 40 |

*The minimum number is a preferred or optimally efficient value and may, in some cases, comprise less than the stated value. In particular, the number of TIP or FEV codes may be as low as 30 without substantially comprising performance.

The access device receives the service request sequence exactly as transmitted from the intelligent channel unit.

In the case of a tandem circuit, the intelligent channel unit transmitting the service request sequence may be a downstream unit with additional intelligent channel units between the access device and itself. In this case, the access device has no way of determining which specific downstream intelligent channel unit transmitted the service request sequence. So, the access device, on reception of a valid service request sequence, queries each and every downstream intelligent channel unit (one at a time), until it finds the one that transmitted the service request sequence. The intelligent channel unit status register (registers 6 and 7 in memory bank 0) provides information as to whether the service request sequence was transmitted by the intelligent channel unit and under what conditions (e.g., on initial power-up, for reporting alarms or performance monitoring threshold crossing, etc.).

In order to prevent accidental detection of the service request sequence over a long period of time, the access device starts a 10-second timer when the service request codes have been successfully received. The timer is turned off when the FEV bytes have been successfully received within the 10-second period. If the timer expires before the access device receives the appropriate number of LBE and FEV codes, the access device ignores the reception of the TIP and Service request codes and returns to normal condition.

Task Execution

For communication initiated either from the access device or from the intelligent channel unit the following three steps are required:
1) Establishment of the in-band communication mode
2) Command/Data byte exchange between the access device and the intelligent channel unit
3) Termination of the in-band communication mode

Establishment of the In-band Communication Mode

The access device transmits a wake-up sequence (previously defined) to the intelligent channel unit to establish the in-band communication mode and then verifies the establishment of the in-band communication mode.

Command/Data Byte Exchange

The access device and the intelligent channel unit perform command/data byte transmission/reception to accomplish a specific task or tasks.

All the thirteen tasks listed above as tasks to be performed by the ICU can be segregated into two distinct categories as follows:
1) Tasks that require checking of the device type register and the status register in the intelligent channel unit before the actual task can be performed.
2) Tasks that do not require checking of any registers in the intelligent channel unit before the actual task can be performed.

The following is a list of tasks that require checking of the device type/status register before the actual task can be performed:
a) Provision the intelligent channel unit
b) Read the performance monitoring registers in the intelligent channel unit
c) Read the provisioning registers in the intelligent channel unit
d) Set threshold register values in the intelligent channel unit To execute any of the above three tasks, the following steps have to be performed:
1) Read the intelligent channel unit device type register
2) Read the intelligent channel unit status register
3) Perform task (if appropriate)

In order to read the intelligent channel unit device type register, the register is selected and the read selected register command is used to read the contents of the register. The exact sequence of typical command-/data/ response byte transactions between the access device and the intelligent channel unit is as shown in Chart 3.

CHART 3

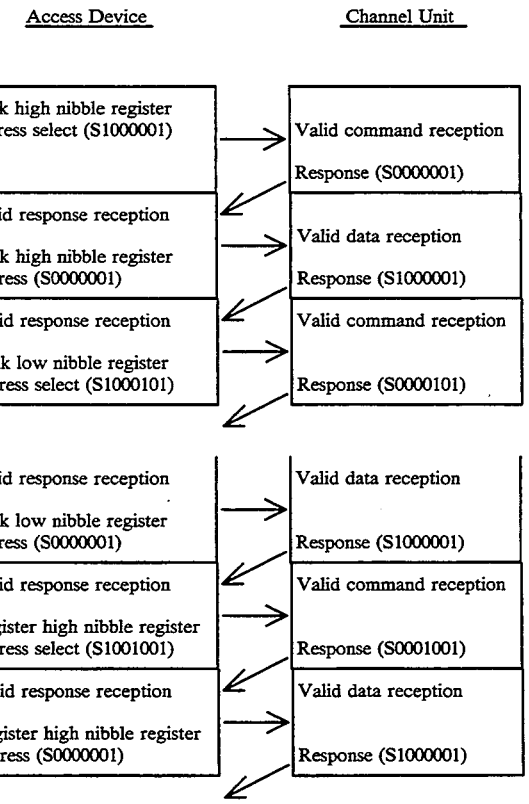

-continued
CHART 3

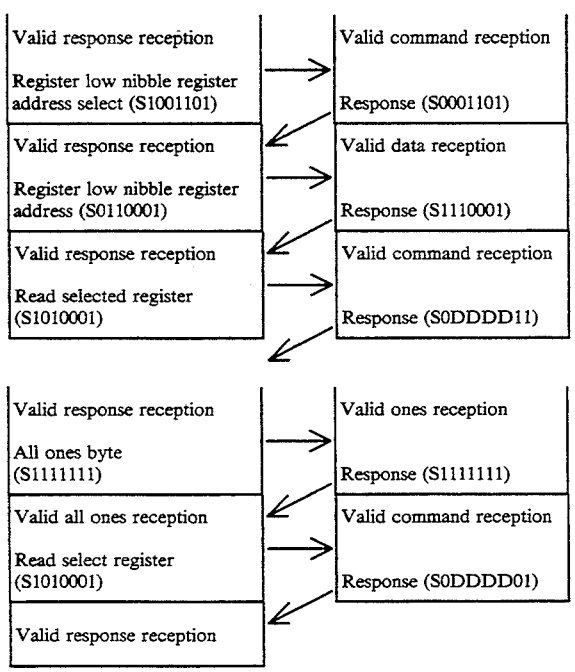

NOTES:
1) The D bits in bits 3 through 6 denote the actual value read from the selected register.
2) The response byte to the first read selected register command sets the More bit (bit 7) to a 1 requesting one more read selected register command from the access device. The intelligent channel unit is pointing at the next sequence register (register number 13) so the second read selected register command will read 4-bit data from the register.

In order to read the intelligent channel unit status register, the register is selected and the read selected register command is used to read the contents of the register. The exact sequence of command/data/response byte transactions between the access device and the intelligent channel unit as shown in Chart 4.

CHART 4
Access Device        Channel Unit

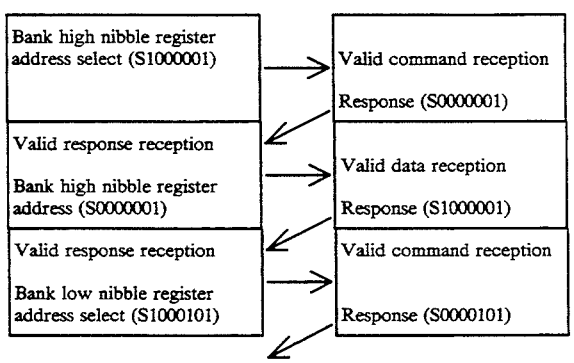

-continued
CHART 4

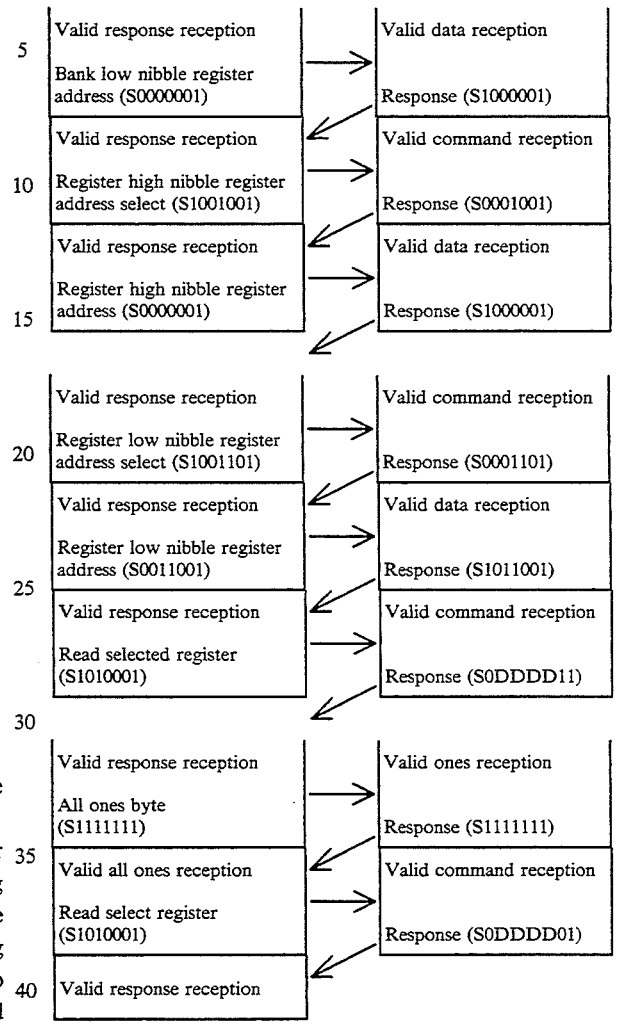

NOTES:
1) The D bits in bits 3 through 6 denote the actual value read from the selected register.
2) The response byte to the first read selected register command sets the More bit (bit 7) to a 1 requesting one more read selected register command from the access device. The intelligent channel unit is pointing at the next sequential register (register number 7) so the second read selected register command will read 4-bit data from this register.

Perform Task

If the state of the registers read is such that the specific task can be executed the following steps should be taken:
a) Select the register to be read from or written to
b) Perform the read/write operation on the selected register.

Tasks Not Device Type/Status Register Associated

The following is a list of tasks that can be directly performed:
1) Read the CLEI code of the intelligent channel unit
2) Read the part number of the intelligent channel unit 3) Read serial number of the intelligent channel unit
4) Read the revision number of the intelligent channel unit
5) Read the device type of the intelligent channel unit
6) Read the intelligent channel unit ID code
7) Read the status registers in the intelligent channel unit
8) Reset the performance monitoring registers in the intelligent channel unit
9) Reset the provisioning parameters in the intelligent channel unit
10) Reset the intelligent channel unit entirely.

In order to execute any of the above tasks the following steps are required:

For a read or a write operation:
a) Select the register to be read from or written to
b) Perform the read/write operation on the selected register.

For other command operation:
a) Issue command directly

Termination of the In-band Communication Mode

After the access device has completed the task, the access device transmits TIP codes (S0111010) to remove the intelligent channel unit from the in-band communication mode.

Additional Operating Modes

The intelligent channel can be configured to operate in a non-intelligent mode if it is unsuccessful in establishing communications link with the access device. Under such a configuration, the ICU would attempt to communicate with the access device for at least ten seconds. If the ICU receives no response from the access device, it defaults to a set of manual switches on the unit. If the access device is later available (e.g., just installed to communicate with the ICU), the ICU could then be manually or remotely reset by commands via the wake-up sequences to the ICU mode.

Even in the non-intelligent mode the ICU still permits reading of a limited set of registers. For example, reading of performance monitoring registers would still be feasible. However, provisioning is not permitted since the unit has defaulted to manual switches.

Auto Rate/Format Adaption

To support tandem unit configurations and interworking with existing vintage channel units, the ICU 19C is required to detect the format it receives and adapt its transmitter to that format. Consider the example shown in FIG. 3 where the access device 40 is connected to an ICU 19C through ICUs 19A and 19B. When first installed, the ICU 19C will send a service request toward the access device. However, the communication path to the access device is through the ICU 19B. To successfully pass data through the ICU 19B, the ICU 19C must send the service request in a format consistent with what the ICU 19B expects.

Figure 5:
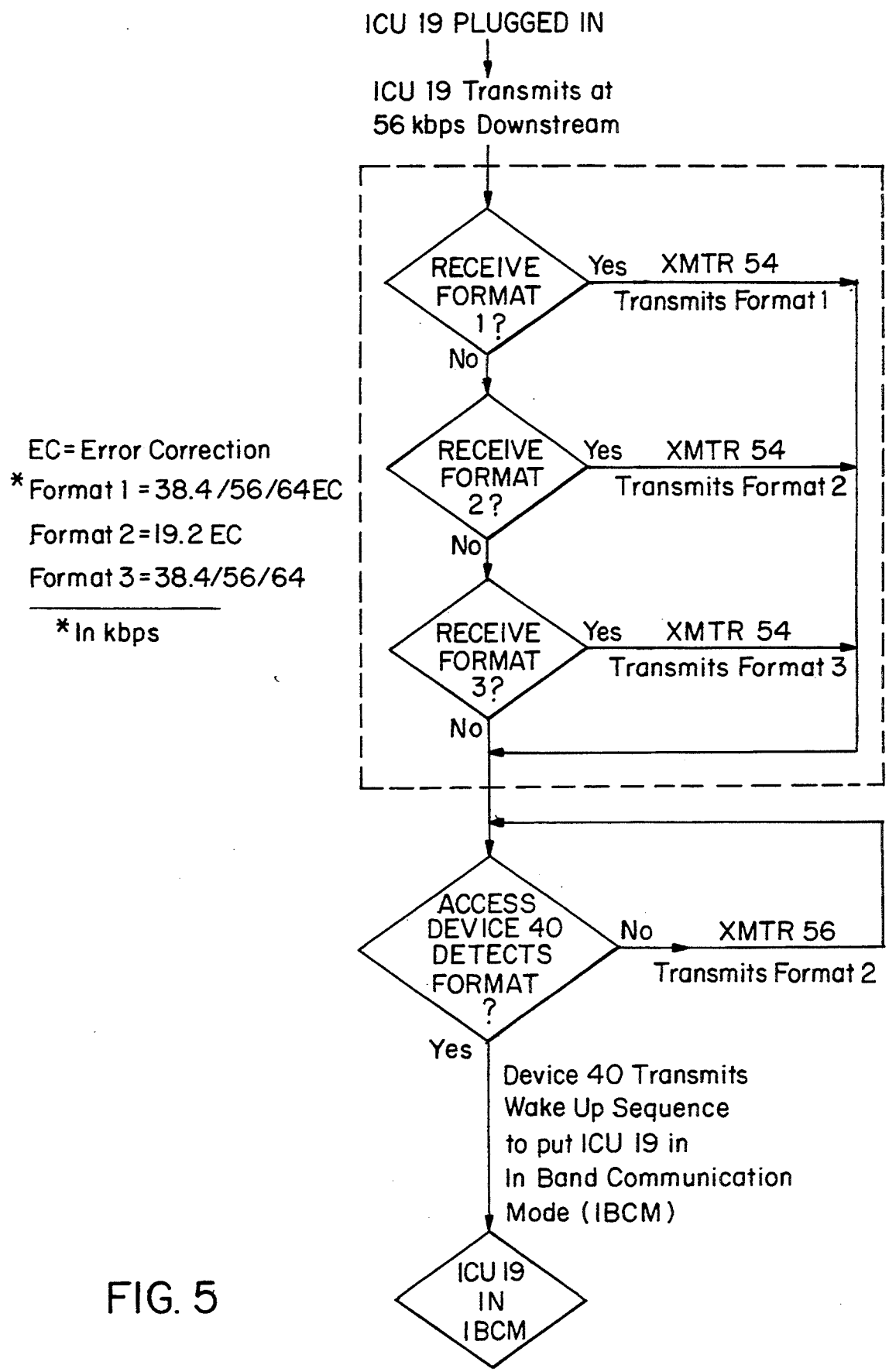
FIG. 5 is a flow diagram illustrating process steps in automatically reconfiguring ICU's for different channel rates using the in-band channel.

The ICU 19B could be configured for rates of 2.4 through 64 Kbps and have error correction enabled or disabled. To be compatible with the ICU 19B format, the ICU 19C has an auto rate/format detection circuit 62 (See FIG. 2) that determines the rate and format (error correction or not) of the received signal on line 62B. After determining the proper format of the ICU 19B, the ICU 19C adjusts its transmitter to match the received rate and format. A self-explanatory flow diagram of this process is shown in FIG. 5.

Note that the ICU 19C is constantly monitoring the received signal format for changes. If the received signal format changes, the ICU 19C can adjust its transmitter to be compatible with the ICU 19B device. Also note that no matter what rate the ICU 19C has auto adapted to and is transmitting at, the ICU 19C will always respond to the wake-up sequence received in 56 Kbps (no error correction) format. This will allow systems that access ICUs at the carrier level (e.g., digital cross connect) to connect to an ICU and always be guaranteed a successful communications path.

Equivalents

Those skilled in the art will recognize or be able to ascertain, using no more than routine experimentation, many equivalents to the specific embodiments of the invention described herein. For example, the logic circuit 39 need not be located at the digital terminal 11 but may be located in the upstream path and coupled to the terminal 11 via the network. Also, since each ICU may be equipped with an intelligent circuit 21, as well as each access device, in-band communication may take place between one or more units and the term "unit", as used in the claims, can encompass an "access device" or a "controller", as well as an ICU. Additionally, it should be noted that in the preferred embodiment described herein, a valid response consists of a multiple number of N bytes, where N is 3. The invention is not to be so limited, since N (in theory) may be 3 or any integer greater than 3. These and all other equivalents are intended to be encompassed by the following claims.

The invention claimed is:

1. A method of communication between first and second units of a communication system after inband communication between said units has been established, each unit having a plurality of storage devices capable of storing bits of information in a storage address and wherein information is transmitted and received between said units in the form of command bytes and data bytes comprising the steps of:
  a) forming said command or data bytes including the step of encoding at least a plurality of bits in said bytes with command or data information, and wherein said command bytes:
    i) specify an address in said storage device, or
    ii) read or write information into specified addresses of said storage device;
  b) transmitting said command or data bytes from said first unit in multiples of N identical sets, where N is an integer number of at least 3 until a valid response of N consecutive identical sets of appropriate response bytes are received from a second unit;
  c) receiving said command bytes or data bytes at said second unit and decoding the command or data information; and
  d) transmitting N consecutive identical sets of appropriate response bytes from said second unit to said first unit as said valid response upon receipt of said N identical sets of command or data bytes and wherein said valid response to data bytes comprises at least said plurality of bits encoded with the data information transmitted from the first unit.

2. The method of claim 1 wherein upon receipt by the first unit of said N identical appropriate response bytes the first unit transmits another set of command or data bytes in multiples of N.

3. The method of claim 1 wherein a command byte is an 8-bit byte comprising bits 1–8 in which:
- bit 1 is a subrate framing bit and is transmitted first and bit 8 is transmitted last;
- bit 2 is a command data identifier bit which identifies whether a command or a data nibble is being transmitted in bits 3–6 of the byte and wherein a nibble is a group of four bits;
- bits 3–6 are command or data nibble bits which contain encoded command or data information for transmission.
- bit 7 is a more bit which indicates whether more commands will be transmitted by the first unit to the second unit; and
- bit 8 is a network control bit which minimizes potential interference with other communication equipment.

4. The method of claim 1 wherein a response byte is an 8-bit byte comprising bits 1–8, as follows:
- bit 1 is a subrate framing bit which is transmitted first and bit 8 is transmitted last;
- bit 2 is a response bit which is the reverse of the logic level of bit 2 from the last command/data byte received from the first unit;
- bits 3, 4, 5 and 6 are response nibble bits and wherein if the second unit receives a valid command byte or a data byte, bits 3 through 6 are encoded exactly the same as the received bits 3 through 6 from the first unit;
- bit 7 is a more bit to identify a register boundary and to indicate to the first unit that an additional nibble should be read from or written to by the first unit to obtain all the bits in a single register of size greater than X-bits; and
- bit 8 is a network control bit used to minimize potential interference with other units of the communication system and wherein X is an integer number.

5. The method of claim 4 including the following alternate steps:
- a) if a valid command byte is received by the second unit and it is a read selected register type command, then the response nibble bits are read from a selected register in bits 3–6;
- b) if the said valid command byte is a reset provisioning parameters type command or a reset all type command, no acknowledgement is expected by the access device and none is given;
- c) and if an invalid command byte is received, bits 3 through 6 in the response nibble are encoded as an E-hexadecimal.

6. A data communication system including:
- first and second channel units located at remote locations each channel unit having storage registers in which digital electrical command signals are stored, the signals comprising: an eight-bit command byte of four-bit length having binary command information in the range of O–C hexadecimal per byte encoded thereon to provide up to thirteen unique command types in a single byte and in which a seventh bit is stored such that if the number of commands supported by the system exceeds thirteen, the seventh bit in the command byte is used to concatenate two bytes to provide up to 169 unique command byte types; and
- a first inband transmitter at said first channel unit for transmitting said command signals to a first inband receiver at said second channel unit; and a second inband transmitter at said second channel unit for transmitting said command signals to a second inband receiver at said first channel unit.

7. The system of claim 6 wherein the encoded value E hexadecimal is reserved for use to indicate reception of an invalid command.

8. The system of claim 6 wherein the encoded value F hexadecimal is not used.

9. The system of claim 6 wherein the encoded value D hexadecimal is reserved for use to indicate reception of a valid command issued to perform an invalid function.

10. Apparatus for providing communications between first and second units of a communication system after inband communication has been established, each unit having a plurality of a storage devices capable of storing bits of information in a storage address and wherein information is transmitted or received in the form of command bytes or data bytes comprising:
- a) a first transmitter for transmitting a set of identical command or data bytes from said first unit in multiples of N, where N is an integer number of at least three, until a valid response of N consecutive identical appropriate response bytes are received from said second unit;
- b) an inband receiver at said second unit coupled to a processor for receiving said command bytes and coupling said command bytes to said processor, which processor decodes the command bytes to select a storage address or to read or write data from or to a selected storage address at the second unit;
- c) a second transmitter for transmitting N consecutive identical appropriate response bytes from said second unit to said first unit as said valid response upon receipt of said N multiples of command or data bytes.

11. The apparatus of claim 10 wherein upon receipt by the first unit of said N identical appropriate response bytes the first transmitter transmits another set of command or data bytes in multiples of N.

12. The apparatus of claim 10 wherein a command byte is an 8-bit byte comprising bits 1–8 in which:
- bit 1 is a subrate framing bit and is transmitted first and bit 8 is transmitted last;
- bit 2 is a command data identifier bit which identifies whether a command or a data nibble is being transmitted in bits 3–6 of the byte and wherein a nibble is a group of four bits;
- bits 3–6 are command or data nibble bits which contain encoded command or data information for transmission;
- bit 7 is a more bit which indicates whether more commands will be transmitted by the first unit to the second unit; and
- bit 8 is a network control bit which minimizes potential interference with other communication equipment.

13. The apparatus of claim 10 wherein a response byte is an 8-bit byte comprising bits 1–8, as follows:
- bit 1 is a subrate framing bit which is transmitted first and bit 8 is transmitted last;
- bit 2 is a response bit which is the reverse of the logic level of bit 2 from the last command/data byte received from the first unit;
- bits 3, 4, 5 and 6 are response nibble bits and wherein if the second unit receives a valid command byte or a data byte, bits 3 through 6 are encoded exactly the same as the received bits 3 through 6 from the first unit;

bit 7 is a more bit to identify a register boundary and to indicate to the first unit that an additional nibble should be read from or written to by the first unit to obtain all the bits in a single register of size greater than X-bits; and bit 8 is a network control bit used to minimize potential interference with other units of the communication system and wherein X is an integer number.

14. A method of data communication between nodes in a communication path comprising the steps of:

a) forming at a first node an electrical digital command signal of an eight-bit command byte having nibbles of four-bit length;

b) encoding the command signal with binary command information in the range O–C hexadecimal per nibble to provide up to thirteen unique command types in a signal nibble and wherein if the number of commands supported exceed thirteen, then c) concatenating two nibbles using a seventh bit in the command byte to provide a multitude of unique command types; and d) transmitting said command signal to a second node.

15. The method of claim 14 wherein the encoded value E hexadecimal is reserved for use to indicate reception of an invalid command.

16. The method of claim 14 wherein the encoded value F hexadecimal is not used.

17. The method of claim 14 wherein the encoded value D hexadecimal is reserved for use to indicate reception of a valid command issued to perform an invalid function.

18. A method of providing inband communication between two units of a communication system, each unit having a plurality of storage devices capable of storing bits of information and wherein information is transmitted and received in the form of command bytes and data bytes comprising the steps of:

a) transmitting a set of identical command or data bytes from a first unit in multiples of N, where N is an integer number of at least 3 until a valid response of N consecutive identical appropriate response bytes are received from a second unit;

b) transmitting N consecutive identical appropriate response bytes from said second unit to said first unit as said valid response upon receipt of said N multiples of command or data bytes and wherein:

(i) said command or data bytes comprise at least a plurality of bits in the bytes which encode command or data information for transmission and said valid response to data bytes comprises at least said plurality of bits encoded with the data information transmitted from the first unit; and (ii) said command byte is an 8-bit byte comprising bits 1–8 in which:

bit 1 is a subrate framing bit and is transmitted first and bit 8 is transmitted last;

bit 2 is a command data identifier bit which identifies whether a command or a data nibble is being transmitted in bits 3–6 of the byte and wherein a nibble is a group of four bits;

bits 3–6 are command or data nibble bits which contain encoded command or data information for transmission;

bit 7 is a more bit which indicates whether more commands will be transmitted by the first unit to the second unit; and bit 8 is a network control bit which minimizes potential interference with other communication equipment.

19. A method of providing inband communication between two units of a communication system, each unit having a plurality of storage devices capable of storing bits of information and wherein information is transmitted and received in the form of command bytes and data bytes comprising the steps of:

a) transmitting a set of identical command or data bytes from a first unit in multiples of N, where N is an integer number of at least 3 until a valid response of N consecutive identical appropriate response bytes are received from a second unit;

b) transmitting N consecutive identical appropriate response bytes from said second unit to said first unit as said valid response upon receipt of said N multiples of command or data bytes and wherein:

(i) said command or data bytes comprise at least a plurality of bits in the bytes which encode command or data information for transmission and said valid response to data bytes comprises at least said plurality of bits encoded with the data information transmitted from the first unit; and (ii) said response byte is an 8-bit byte comprising bits 1–8, as follows:

bit 1 is a subrate framing bit which is transmitted first and bit 8 is transmitted last;

bit 2 is a response bit which is the reverse of the logic level of bit 2 from the last command-/data byte received from the first unit;

bits 3, 4, 5 and 6 are response nibble bits and wherein if the second unit receives a valid command byte or a data byte, bits 3 through 6 are encoded exactly the same as the received bits 3 through 6 from the first unit;

bit 7 is a more bit to identify a register boundary and to indicate to the first unit that an additional nibble should be read from or written to by the first unit to obtain all the bits in a single register of size greater than X-bits; and bit 8 is a network control bit used to minimize potential interference with other units of the communication system and wherein X is an integer number.

20. The method of claim 19 including the following alternate steps:

a) if a valid command byte is received by the second unit and it is read selected register type command, then the response nibble bits are read from a selected register in bits 3–6;

b) if the said valid command byte is a reset provisioning parameters type command or a reset all type command, no acknowledgement is expected by the access device and none is given;

c) and if an invalid command byte is received, bits 3 through 6 in the response nibble are encoded as an E-hexadecimal.

21. Apparatus for providing inband communication between two units of a communication system, each unit having a plurality of storage devices capable of storing bits of information and wherein information is transmitted or received in the form of command bytes or data bytes comprising:

a) a first transmitter for transmitting a set of identical command or data bytes from a first unit in multiples of N, where N is an integer number of at least three, until a valid response of N consecutive identical appropriate response bytes are received from a second unit;

b) a second transmitter for transmitting N consecutive identical appropriate response bytes from said second unit to said first unit as said valid response upon receipt of said N multiples of command or data bytes and wherein a command byte is an 8-bit byte comprising bits 1–8 in which:

bit 1 is a subrate framing bit and is transmitted first and bit 8 is transmitted last;

bit 2 is a command data identifier bit which identifies whether a command or a data nibble is being transmitted in bits 3–6 of the byte and wherein a nibble is a group of four bits;

bits 3–6 are command or data nibble bits which contain encoded command or data information for transmission;

bit 7 is a more bit which indicates whether more commands will be transmitted by the first unit to the second unit; and bit 8 is a network control bit which minimizes potential interference with other communication equipment.

22. Apparatus for providing inband communication between two units of a communication system, each unit having a plurality of storage devices capable of storing bits of information and wherein information is transmitted or received in the form of command bytes or data bytes comprising:

a) a first transmitter for transmitting a set of identical command or data bytes from a first unit in multiples of N, where N is an integer number of at least three, until a valid response of N consecutive identical appropriate response bytes are received from a second unit;

b) a second transmitter for transmitting N consecutive identical appropriate response bytes from said second unit to said first unit as said valid response upon receipt of said N multiples of command or data bytes and wherein a response byte is an 8-bit byte comprising bits 1–8, as follows:

bit 1 is a subrate framing bit which is transmitted first and bit 8 is transmitted last;

bit 2 is a response bit which is the reverse of the logic level of bit 2 from the last command/data byte received from the first unit;

bits 3, 4, 5 and 6 are response nibble bits and wherein if the second unit receives a valid command byte or a data byte, bits 3 through 6 are encoded exactly the same as the received bits 3 through 6 from the first unit;

bit 7 is a more bit to identify a register boundary and to indicate to the first unit that an additional nibble should be read from or written to by the first unit to obtain all the bits in a single register of size greater than X-bits; and bit 8 is a network control bit used to minimize potential interference with other units of the communication system and wherein X is an integer number.

* * * * *